United States Patent
Li et al.

(10) Patent No.: US 12,185,024 B2
(45) Date of Patent: Dec. 31, 2024

(54) VIDEO COMMUNICATION METHOD AND VIDEO COMMUNICATIONS APPARATUS

(71) Applicant: Huawei Technologies Co., Ltd., Shenzhen (CN)

(72) Inventors: Tao Li, Beijing (CN); Qiang Tao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 144 days.

(21) Appl. No.: 17/761,882

(22) PCT Filed: Sep. 17, 2020

(86) PCT No.: PCT/CN2020/115747
§ 371 (c)(1),
(2) Date: Mar. 18, 2022

(87) PCT Pub. No.: WO2021/052388
PCT Pub. Date: Mar. 25, 2021

(65) Prior Publication Data
US 2022/0377278 A1    Nov. 24, 2022

(30) Foreign Application Priority Data
Sep. 18, 2019  (CN) .......................... 201910883705.5

(51) Int. Cl.
*H04N 7/14* (2006.01)
*B64U 101/30* (2023.01)

(52) U.S. Cl.
CPC ......... *H04N 7/147* (2013.01); *B64U 2101/30* (2023.01)

(58) Field of Classification Search
CPC .... H04N 7/147; B64C 39/024; B64C 2101/30
(Continued)

(56) References Cited

U.S. PATENT DOCUMENTS 9,274,521 B1    3/2016  Stefani et al.
9,927,809 B1    3/2018  Tofte et al.
(Continued)

FOREIGN PATENT DOCUMENTS

CN    103686084 A    3/2014
CN    105163059 A    12/2015
(Continued)

OTHER PUBLICATIONS

Haifeng Huang, et al., "Huawei CaaS2.0 Accelerates Carrier Network Communication Capability Openness," Communication Expo, Special Newsletter, 2016, 1 page.

*Primary Examiner* — Binh Kien Tieu
(74) *Attorney, Agent, or Firm* — Conley Rose, P.C.

(57) ABSTRACT

A video communication method and associated apparatus and program are adapted for detecting an operation of starting a first application, where the first application controls a video collection device to perform video collection. The first application begins in a started state, displaying a home page of the first application and a video communication button on a display interface of the video communications device. At least one contact is displayed in response to a triggering operation performed on the video communication button, a first contact is determined in response to a user selection, and video communication with the first contact is established.

20 Claims, 9 Drawing Sheets

(58) Field of Classification Search
USPC .................................................... 348/14.08
See application file for complete search history.

(56) References Cited

U.S. PATENT DOCUMENTS

| | | | |
|---|---|---|---|
| 10,824,149 B2* | 11/2020 | Wang ................... | G05D 1/0669 |
| 11,307,584 B2* | 4/2022 | Jobanputra .......... | G05D 1/0094 |
| 11,404,056 B1* | 8/2022 | Meisenholder ........ | G10L 15/25 |
| 2011/0181683 A1* | 7/2011 | Nam .................... | H04N 21/485 |
| | | | 348/E7.078 |
| 2018/0240330 A1 | 8/2018 | Choi et al. | |
| 2018/0246507 A1 | 8/2018 | Bachrach et al. | |
| 2018/0376106 A1 | 12/2018 | Pandey et al. | |
| 2019/0250601 A1* | 8/2019 | Donahoe .............. | G05D 1/0016 |
| 2020/0259879 A1 | 8/2020 | Xiong et al. | |
| 2021/0392191 A1* | 12/2021 | Johnson ................ | G06Q 10/10 |

FOREIGN PATENT DOCUMENTS

| | | | |
|---|---|---|---|
| CN | 105711518 A | 6/2016 | |
| CN | 105847913 A | 8/2016 | |
| CN | 106507122 A | 3/2017 | |
| CN | 106878651 A | 6/2017 | |
| CN | 107465935 A | 12/2017 | |
| CN | 107888953 A | 4/2018 | |
| CN | 108282507 A | 7/2018 | |
| CN | 108702369 A | 10/2018 | |
| CN | 108933700 A | 12/2018 | |

* cited by examiner

VIDEO COMMUNICATION METHOD AND VIDEO COMMUNICATIONS APPARATUS

CROSS-REFERENCE TO RELATED APPLICATIONS

This is a U.S. National Stage of International Patent Application No. PCT/CN2020/115747 filed Sep. 17, 2020, which claims priority to Chinese Patent Application No. 201910883705.5 filed Sep. 18, 2019, both of which are hereby incorporated by reference in their entireties.

TECHNICAL FIELD

This application relates to the field of communications technologies, and in particular, to a video communication method, a video communications apparatus, a computer-readable storage medium, a computer program product, and a chip.

BACKGROUND

Internet-based audio and video communication is very common. However, in current audio and video communication, for example, audio and video communication like WeChat, Facetime, and Google Duo, a video shot by a local camera is used as a local video and sent to a peer end for display. A video call function in the conventional technology has a technical problem that an operation is excessively complex.

SUMMARY

This application provides a video communication method, a video communications apparatus, a computer-readable storage medium, a computer program product, and a chip, to provide an efficient video call implementation solution.

According to a first aspect, an embodiment of the present invention provides a video call method, applied to a video communications device and including:
  detecting an operation of starting a first application, where the first application is used to control a video collection device to perform video collection;
  controlling the first application to be in a started state, displaying a home page of the first application and a video communication button on a display interface of the video communications device; and displaying at least one contact in response to a triggering operation performed on the video communication button; and
  determining a first contact from the at least one contact in response to a user selection, and establishing video communication with the first contact.

Optionally, the video collection device is an uncrewed aerial vehicle, and after the determining a first contact from the at least one contact in response to a user selection, and establishing video communication with the first contact, the method further includes:
  controlling the uncrewed aerial vehicle to enter a flight state in response to a take-off operation; and
  after the uncrewed aerial vehicle enters the flight state, controlling the video communication button to be in a hidden state.

Optionally, after the establishing video communication with the first contact, the method further includes:
  displaying a video receiving window, where the video receiving window is configured to display video data obtained from the first contact.

According to a second aspect, an embodiment of the present invention provides a video communications device, including:
  one or more processors;
  a memory;
  a plurality of applications; and
  one or more computer programs, where the one or more computer programs are stored in the memory, the one or more computer programs include instructions, and when the instructions are executed by an electronic device, the electronic device is enabled to perform the method according to any embodiment of the present invention.

Optionally, a computer-readable storage medium including instructions is provided. When the instructions are run on an electronic device, the electronic device is enabled to perform the method according to any embodiment of the present invention.

Optionally, a computer program product including instructions is provided. When the computer program product runs on an electronic device, the electronic device is enabled to perform the method according to any embodiment of the present invention.

Optionally, a chip including instructions is provided. When the chip runs on an electronic device, the electronic device is enabled to perform the method according to any embodiment of the present invention.

DESCRIPTION OF EMBODIMENTS

The following clearly describes the technical solutions in the embodiments of this application in detail with reference to the accompanying drawings. In the descriptions of the embodiments of this application, unless otherwise stated, "/" indicates "or". For example, A/B may indicate A or B. The term "and/or" in this specification merely describes an association for describing associated objects, and indicates that three relationships may exist. For example, A and/or B may indicate the following three cases: Only A exists, both A and B exist, and only B exists. In addition, in the descriptions of the embodiments of this application, "a plurality of" means two or more.

The terms "first" and "second" mentioned below are merely intended for description, and shall not be understood as an indication or implication of relative importance or implicit indication of a quantity of indicated technical features. Therefore, a feature limited by "first" or "second" may explicitly or implicitly include one or more features. In the descriptions of the embodiments of this application, unless otherwise specified, "a plurality of" means two or more.

First, an example electronic device 100 provided in the following embodiments of this application is described.

Figure 1:
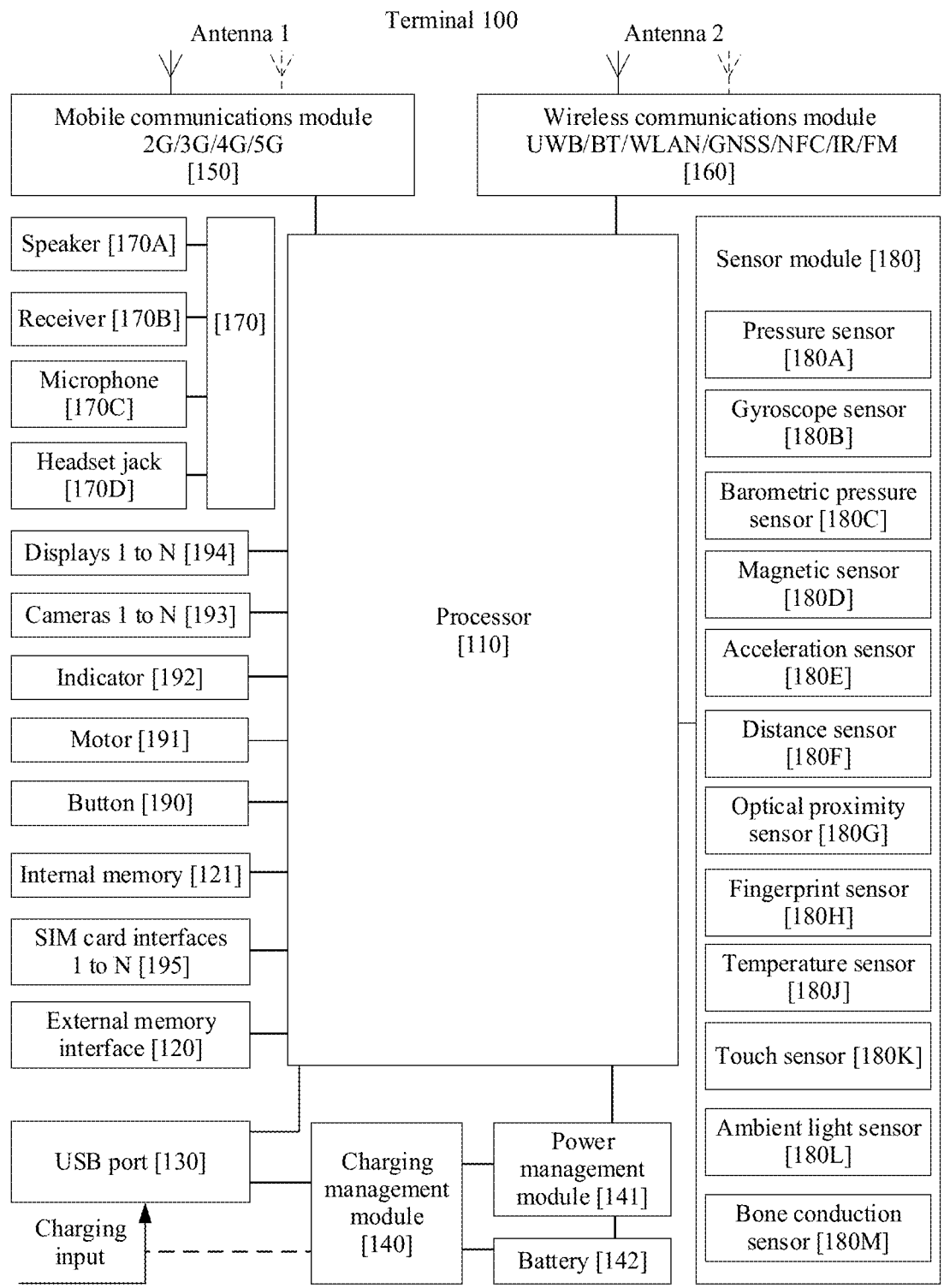
FIG. 1 is a schematic diagram of a structure of an electronic device according to an embodiment of this application.

FIG. 1 is a schematic diagram of a structure of the electronic device 100.

The electronic device 100 is used as an example below to describe the embodiments in detail. It should be understood that the electronic device 100 shown in FIG. 1 is merely an example, and the electronic device 100 may have more or fewer components than those shown in FIG. 1, or two or more components may be combined, or different component configurations may be used. Various components shown in the figure may be implemented in hardware that includes one or more signal processing and/or application-specific integrated circuits, software, or a combination of hardware and software.

The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of the present invention constitutes no specific limitation on the electronic device 100. In some other embodiments of this application, the electronic device 100 may include more or fewer components than those shown in the figure, or some components may be combined, or some components may be split, or there may be a different component layout. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors.

The controller may be a nerve center and a command center of the electronic device 100. The controller may generate an operation control signal based on an instruction operation code and a time sequence signal, to complete control of instruction fetching and instruction execution.

A memory may further be disposed in the processor 10, and is configured to store instructions and data. In some embodiments, the memory in the processor 110 is a cache. The memory may store instructions or data just used or cyclically used by the processor 110. If the processor 110 needs to use the instructions or the data again, the processor 110 may directly invoke the instructions or the data from the memory. This avoids repeated access and reduces a waiting time of the processor 110, so that system efficiency is improved.

In some embodiments, the processor 110 may include one or more interfaces. The interface may include an inter-integrated circuit (inter-integrated circuit, I2C) interface, an interintegrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes a serial data line (serial data line, SDA) and a serial clock line (serial clock line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through an I2C interface, so that the processor 110 communicates with the touch sensor 180K through the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transfer an audio signal to the wireless communications module 160 through the I2S interface, to implement a function of answering a call by using a Bluetooth headset.

The PCM interface may also be configured to perform audio communication, and sample, quantize, and code an analog signal. In some embodiments, the audio module 170 may be coupled to the wireless communications module 160 through a PCM bus interface. In some embodiments, the audio module 170 may alternatively transfer an audio signal to the wireless communications module 160 through the PCM interface, to implement a function of answering a call by using a Bluetooth headset. Both the I2S interface and the PCM interface may be configured to perform audio communication.

The UART interface is a universal serial data bus, and is configured to perform asynchronous communication. The bus may be a two-way communications bus. The bus converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transfer an audio signal to the wireless communications module 160 through the UART interface, to implement a function of playing music by using a Bluetooth headset.

The MIPI interface may be configured to connect the processor 110 to a peripheral component, for example, the display 194 or the camera 193. The MIPI interface includes a camera serial interface (camera serial interface, CSI), a display serial interface (display serial interface, DSI), and the like. In some embodiments, the processor 110 communicates with the camera 193 through the CSI, to implement a photographing function of the electronic device 100. The processor 110 communicates with the display 194 through the DI, to implement a display function of the electronic device 100.

The GPIO interface may be configured by using software. The GPIO interface may be configured as a control signal or a data signal. In some embodiments, the GPIO interface may be configured to connect the processor 110 to the camera 193, the display 194, the wireless communications module 160, the audio module 170, the sensor module 180, or the like. The GPIO interface may alternatively be configured as an I2C interface, an I2S interface, a UART interface, an MIPI interface, or the like.

The USB port 130 is a port that conforms to a USB standard specification, and may be specifically a mini USB port, a micro USB port, a USB Type-C port, or the like. The USB port 130 may be configured to connect to the charger to charge the electronic device 100, or may be configured to transmit data between the electronic device 100 and a peripheral device. The USB port 130 may alternatively be configured to connect to a headset, to play audio by using the headset. Alternatively, the port may be configured to connect to another electronic device, for example, an AR device.

It may be understood that an interface connection relationship between the modules that is shown in this embodiment of the present invention is merely an example for description, and constitutes no limitation on the structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive a charging input from the charger. The charger may be a wireless charger or a wired charger. In some embodiments of wired charging, the charging management module 140 may receive a charging input from a wired charger through the USB port 130. In some embodiments of wireless charging, the charging management module 140 may receive a wireless charging input through a wireless charging coil of the electronic device 100. When charging the battery 142, the charging management module 140 may further supply power to the electronic device by using the power management module 141.

The power management module 141 is configured to connect the battery 142 and the charging management module 140 to the processor 110. The power management module 141 receives an input from the battery 142 and/or the charging management module 140, and supplies power to the processor 110, the internal memory 121, an external memory, the display 194, the camera 193, the wireless communications module 160, and the like. The power management module 141 may further be configured to monitor parameters such as a battery capacity, a quantity of battery cycles, and a battery health status (electric leakage or impedance). In some other embodiments, the power management module 141 may alternatively be disposed in the processor 110. In some other embodiments, the power management module 141 and the charging management module 140 may alternatively be disposed in a same component.

A wireless communication function of the electronic device 100 may be implemented through the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the electronic device 100 may be configured to cover one or more communications frequency bands. Different antennas may further be multiplexed, to improve antenna utilization. For example, the antenna 1 may be multiplexed as a diversity antenna in a wireless local area network. In some other embodiments, an antenna may be used in combination with a tuning switch.

The mobile communications module 150 may provide a solution that is applied to the electronic device 100 and that includes wireless communication such as 2G, 3G, 4G, and 5G. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering and amplification on the received electromagnetic wave, and transmit a processed electromagnetic wave to the modem processor for demodulation. The mobile communications module 150 may further amplify a signal modulated by the modem processor, and convert an amplified signal into an electromagnetic wave for radiation through the antenna 1. In some embodiments, at least some function modules of the mobile communications module 150 may be disposed in the processor 110. In some embodiments, at least some function modules of the mobile communications module 150 and at least some modules of the processor 110 may be disposed in a same component.

The modem processor may include a modulator and a demodulator. The modulator is configured to modulate a to-be-sent low-frequency baseband signal into a medium or high-frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor, and then transmitted to the application processor. The application processor outputs a sound signal through an audio device (which is not limited to the speaker 170A, the receiver 170B, or the like), or displays an image or a video by using the display 194. In some embodiments, the modem processor may be an independent component. In some other embodiments, the modem processor may be independent of the processor 110, and disposed in a same component with the mobile communications module 150 or another function module.

The wireless communications module 160 may provide a solution that is applied to the electronic device 100 and that includes wireless communication such as a wireless local area network (wireless local area network, WLAN) (for example, a wireless fidelity (wireless fidelity, Wi-Fi) network). Bluetooth (Bluetooth, BT), a global navigation satellite system (global navigation satellite system, GNSS), frequency modulation (frequency modulation, FM), a near field communication (near field communication, NFC) technology, and an infrared (infrared, IR) technology. The wireless communications module 160 may be one or more components integrating at least one communications processor module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave for radiation through the antenna 2.

In some embodiments, the antenna 1 and the mobile communications module 150 in the electronic device 100 are coupled, and the antenna 2 and the wireless communications module 160 in the electronic device 100 are coupled, so that the electronic device 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The electronic device 100 implements a display function through the GPU, the display 194, the application processor, and the like. The GPU is a microprocessor for image processing, and is connected to the display 194 and the application processor. The GPU is configured to perform mathematical and geometric calculation, and render an image. The processor 110 may include one or more GPUs that execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light-emitting diode or active-matrix organic light-emitting diode (active-matrix organic light emitting diode, AMOLED), a flexible light-emitting diode (flex light-emitting diode, FLED), a mini-LED, a micro-LED, a micro-OLED, quantum dot light emitting diodes (quantum dot light emitting diodes, (LEDs), or the like. In some embodiments, the electronic device 100 may include one or N displays 194, where N is a positive integer greater than 1.

The electronic device 100 may implement a photographing function through the ISP, the camera 193, the video codec, the GPU, the display 194, the application processor, and the like.

The ISP is configured to process data fed back by the camera 193. For example, during photographing, a shutter is pressed, light is transmitted to a photosensitive element of the camera through a lens, an optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format, for example, RGB or YUV. In some embodiments, the electronic device 100 may include one or N cameras 193, where N is a positive integer greater than 1.

The digital signal processor is configured to process a digital signal, and may further process another digital signal in addition to the digital image signal. For example, when the electronic device 100 selects a frequency, the digital signal processor is configured to perform Fourier transform and the like on frequency energy.

The video codec is configured to compress or decompress a digital video. The electronic device 100 may support one or more video codecs. In this way, the electronic device 100 may play or record videos in a plurality of coding formats, for example, moving picture experts group (moving picture experts group, MPEG)—1, MPEG-2, MPEG-3, and MPEG-4.

The NPU is a neural-network (neural-network, NN) computing processor. The NPU quickly processes input information by referring to a structure of a biological neural network, for example, a transfer mode between human brain neurons, and may further continuously perform self learning. The NPU can implement applications such as intelligent cognition of the electronic device 100, such as image recognition, facial recognition, speech recognition, and text understanding.

The external memory interface 120 may be configured to connect to an external storage card, for example, a micro SD card, to extend a storage capability of the electronic device 100. The external storage card communicates with the processor 110 through the external memory interface 120, to implement a data storage function. For example, files such as music and a video are stored in the external storage card.

The internal memory 121 may be configured to store computer-executable program code. The executable program code includes instructions. The processor 110 runs the instructions stored in the internal memory 121, to perform various function applications of the electronic device 100 and data processing. The internal memory 121 may include a program storage area and a data storage area. The program storage area may store an operating system, an application required by at least one function (for example, a sound playing function or an image playing function), and the like.

The data storage area may store data (for example, audio data or a phone book) created during use of the electronic device 100, and the like. In addition, the internal memory 121 may include a high-speed random access memory, or may further include a non-volatile memory such as at least one magnetic disk storage component, a flash component, or a universal flash storage (universal flash storage, UFS).

The electronic device 100 may implement an audio function, for example, music playing or recording, by using the audio module 170, the speaker 170A, the receiver 170B, the microphone 170C, the headset jack 170D, the application processor, and the like.

The audio module 170 is configured to convert digital audio information into an analog audio signal output, and is also configured to convert an analog audio input into a digital audio signal. The audio module 170 may further be configured to encode and decode an audio signal. In some embodiments, the audio module 170 may be disposed in the processor 110, or some function modules of the audio module 170 are disposed in the processor 110.

The speaker 170A, also referred to as a "loudspeaker", is configured to convert an audio electrical signal into a sound signal. The electronic device 100 may be used to listen to music or answer a call in hands-free mode by using the speaker 170A.

The receiver 170B, also referred to as an "earpiece", is configured to convert an electrical audio signal into a sound signal. When a call is answered or voice information is listened to by using the electronic device 100, the receiver 170B may be put close to a human ear to listen to a voice.

The microphone 170C, also referred to as a "mike" or a "mic", is configured to convert a sound signal into an electrical signal. When making a call or sending voice information, a user may make a sound near the microphone 170C through the mouth of the user, to input a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, implement noise reduction, and identify a sound source, to implement a directional recording function and the like.

The headset jack 170D is configured to connect to a wired headset. The headset jack 170D may be the USB port 130, a 3.5 mm open mobile terminal platform (open mobile terminal platform, OMTP) standard interface, or a cellular telecommunications industry association of the USA (cellular telecommunications industry association of the USA, CTIA) standard interface.

The pressure sensor 180A is configured to sense a pressure signal, and may convert the pressure signal into an electrical signal. In some embodiments, the pressure sensor 180A may be disposed on the display 194. There are many types of pressure sensors 180A, for example, a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on a capacitance change. When a touch operation is performed on the display 194, the electronic device 100 detects intensity of the touch operation by using the pressure sensor 180A. The electronic device 100 may also calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on an application icon "Messaging", an instruction for viewing an SMS message is executed. When a touch operation whose touch operation intensity is greater than or equal to the first pressure threshold is performed on the application icon "Messaging", an instruction for creating a new SMS message is executed.

The gyro sensor 180B may be configured to determine a motion posture of the electronic device 100. In some embodiments, an angular velocity of the electronic device 100 around three axes (that is, axes X, Y, and Z) may be determined by using the gyro sensor 180B. The gyro sensor 180B may be configured to perform image stabilization during photographing. For example, when a shutter is pressed, the gyro sensor 180B detects an angle at which the electronic device 100 jitters, calculates, based on the angle, a distance for which a lens module needs to compensate, and allows the lens to cancel the jitter of the electronic device 100 through reverse motion, to implement image stabilization. The gyro sensor 180B may further be used in a navigation scenario and a motion-sensing game scenario.

The barometric pressure sensor 180C is configured to measure barometric pressure. In some embodiments, the electronic device 100 calculates an altitude based on a value of the barometric pressure measured by the barometric pressure sensor 180C, to assist in positioning and navigation.

The magnetic sensor 180D includes a Hall sensor. The electronic device 100 may detect opening and closing of a flip cover leather case by using the magnetic sensor 180D. In some embodiments, when the electronic device 100 is a flip phone, the electronic device 100 may detect opening and closing of a flip cover by using the magnetic sensor 180D. Further, a feature, for example, automatic unlocking upon opening of the flip cover is set based on a detected opening or closing state of the leather case or a detected opening or closing state of the flip cover.

The acceleration sensor 180E may detect magnitudes of accelerations of the electronic device 100 in various directions (generally on three axes), and may detect a magnitude and a direction of gravity when the electronic device 100 is still. The acceleration sensor 180E may further be configured to identify a posture of the electronic device, and is used in an application, for example, switching between landscape mode and portrait mode or a pedometer.

The distance sensor 180F is configured to measure a distance. The electronic device 100 may measure the distance in an infrared or laser manner. In some embodiments, in a photographing scenario, the electronic device 100 may measure a distance by using the distance sensor 180F to implement quick focusing.

The optical proximity sensor 180G may include, for example, a light-emitting diode (LED) and an optical detector, for example a photodiode. The light-emitting diode may be an infrared light-emitting diode. The electronic device 100 emits infrared light by using the light-emitting diode. The electronic device 100 detects infrared reflected light from a nearby object by using the photodiode. When sufficient reflected light is detected, it may be determined that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear for a call, to automatically turn off a screen for power saving. The optical proximity sensor 180G may also be used in smart cover mode or pocket mode to automatically unlock or lock the screen.

The ambient light sensor 180L is configured to sense ambient light brightness. The electronic device 100 may adaptively adjust brightness of the display 194 based on the sensed ambient light brightness. The ambient light sensor 180L may also be configured to automatically adjust a white balance during photographing. The ambient light sensor 180L may further cooperate with the optical proximity sensor 180E to detect whether the electronic device 100 is in a pocket, to prevent an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy based on the temperature detected by the temperature sensor 180J. For example, when the temperature reported by the temperature sensor 180J exceeds a threshold, the electronic device 100 lowers performance of a processor located near the temperature sensor 180J, to reduce power consumption to implement thermal protection. In some other embodiments, when the temperature is less than another threshold, the electronic device 100 heats the battery 142 to prevent the electronic device 100 from being shut down abnormally due to a low temperature. In some other embodiments, when the temperature is less than still another threshold, the electronic device 100 boosts an output voltage of the battery 142 to avoid abnormal shutdown due to a low temperature.

The touch sensor 180K is also referred to as a "touch panel". The touch sensor 180K may be disposed on the display 194, and the touch sensor 180K and the display 194 form a touchscreen, which is also referred to as a "touch screen". The touch sensor 180K is configured to detect a touch operation performed on or near the touch sensor 180K. The touch sensor may transfer the detected touch operation to the application processor to determine a type of a touch event. The display 194 may provide a visual output related to the touch operation. In some other embodiments, the touch sensor 180K may alternatively be disposed on a surface of the electronic device 100 at a location different from that of the display 194.

The bone conduction sensor 180M may obtain a vibration signal. In some embodiments, the bone conduction sensor 180M may obtain a vibration signal of a vibration bone of a human vocal part. The bone conduction sensor 180M may also be in contact with a human pulse, to receive a blood pressure beating signal. In some embodiments, the bone conduction sensor 180M may alternatively be disposed in the headset, to obtain a bone conduction headset. The audio module 170 may obtain a voice signal through parsing based on the vibration signal that is of the vibration bone of the vocal part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button or a touch button. The electronic device 100 may receive a key input, and generate a key signal input related to a user setting and function control of the electronic device 100.

The motor 191 may generate a vibration prompt. The motor 191 may be configured to provide an incoming call vibration prompt or a touch vibration feedback. For example, touch operations performed on different applications (for example, photographing and audio playing) may correspond to different vibration feedback effects. The motor 191 may also correspond to different vibration feedback effects for touch operations performed on different areas of the display 194. Different application scenarios (for example, a time reminder, information receiving, an alarm clock, a game) may also correspond to different vibration feedback effects. A touch vibration feedback effect may further be customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 can support a nano-SIM card, a micro-SIM card, a SIM card, and the like. A plurality of cards may be inserted into a same SIM card interface 195 at the same time. The plurality of cards may be of a same type or of different types. The SIM card interface 195 may also be compatible with different types of SIM cards. The SIM card interface 195 may also be compatible with an external storage card. The electronic device 100 interacts with a network through the SIM card, to implement functions such as calling and data communication. In some embodiments, the electronic device 100 uses an eSIM, namely, an embedded SIM card. The eSIM card may be embedded into the electronic device 100, and cannot be separated from the electronic device 100.

The electronic device 100 may further include a magnetometer (not shown in the figure), which may also be referred to as an electronic compass or a compass, and may be configured to detect intensity and a direction of a magnetic field.

Figure 2:
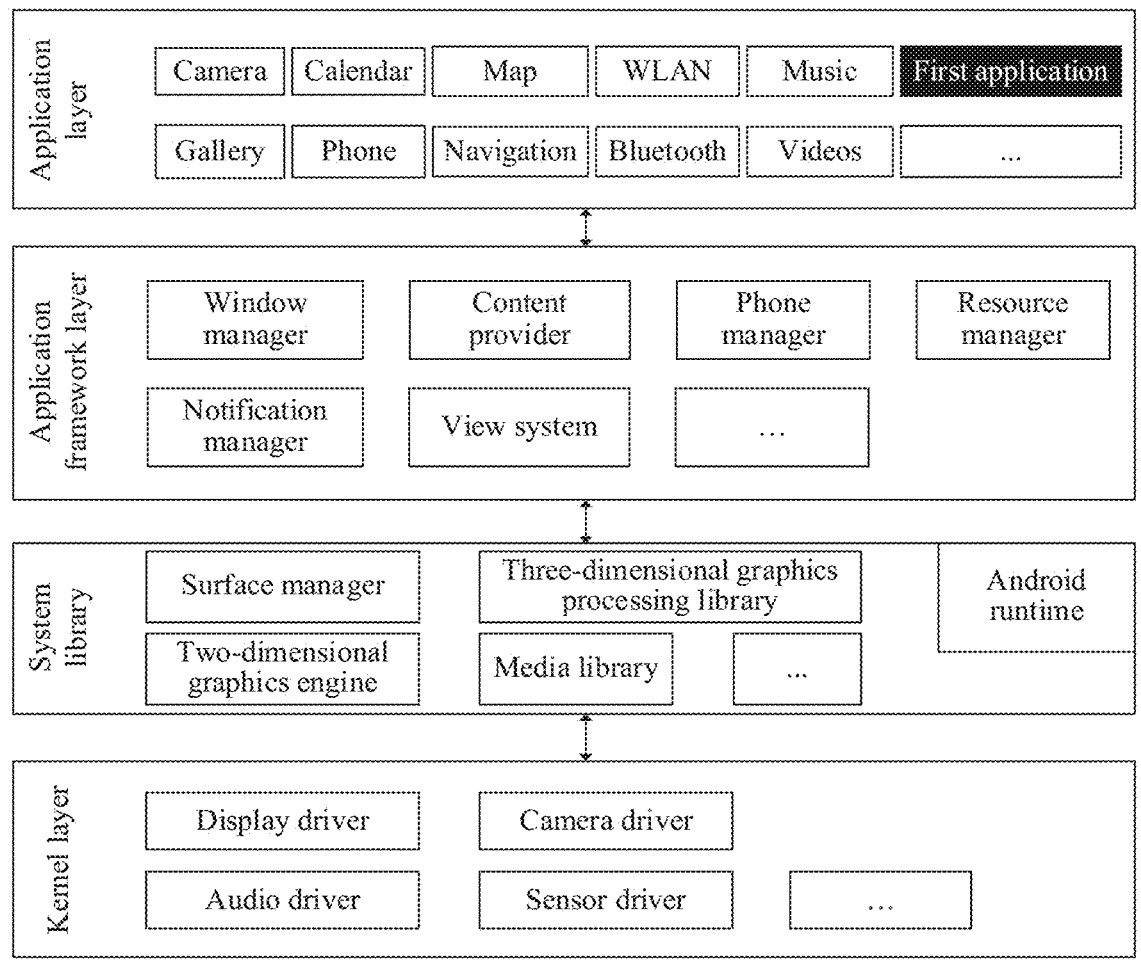
FIG. 2 is a diagram of a software framework of an electronic device according to an embodiment of this application.

FIG. 2 is a block diagram of a software structure of the electronic device 100 according to an embodiment of the present invention.

In a layered architecture, software is divided into several layers, and each layer has a clear role and task. The layers communicate with each other through a software interface. In some embodiments, an Android system is divided into four layers: an application layer, an application framework layer, an Android runtime (Android runtime) and system library, and a kernel layer from top to bottom.

The application layer may include a series of application packages.

As shown in FIG. 2, the application layer may include application packages such as "Camera", "Gallery", "Calendar", "Phone", "Map", "Navigation", "WLAN", "Bluetooth", "Music", "Videos", and "Messaging".

In some embodiments of this application, the application layer may include a first application, the first application may be a smart home application, and the user may set and manage a smart home device by using the application. For example, the user may set an IFTTT rule by using the first application, and a plurality of second electronic devices in a home network may be linked according to the IFTTT rule set by the user, to provide a smart home life for the user.

The application framework layer provides an application programming interface (application programming interface, API) and a programming framework for an application at the application layer. The application framework layer includes some predefined functions.

As shown in FIG. 2, the application framework layer may include a window manager, a content provider, a view system, a phone manager, a resource manager, a notification manager, and the like.

The window manager is configured to manage a window program. The window manager may obtain a size of a display, determine whether there is a status bar, perform screen locking, take a screenshot, and the like.

The content provider is configured to: store and obtain data, and enable the data to be accessed by an application. The data may include a video, an image, audio, calls that are made and answered, a browsing history, a bookmark, a phone book, and the like.

The view system includes visual controls, such as a control for displaying a text and a control for displaying a picture. The view system may be configured to construct an application. A display interface may include one or more views. For example, a display interface including an SMS message notification icon may include a text display view and a picture display view.

The phone manager is configured to provide a communication function of the electronic device 100, for example, management of a call status (including answering, declining, and the like).

The resource manager provides an application with various resources such as a localized character string, an icon, a picture, a layout file, and a video file.

The notification manager enables an application to display notification information in a status bar, and may be configured to convey a notification type message. The displayed notification information may automatically disappear after a short pause without user interaction. For example, the notification manager is configured to: notify download completion, provide a message notification, and the like. The notification manager may alternatively be a notification that appears in a top status bar of the system in a form of a graph or a scroll bar text, for example, a notification of an application running in the background or a notification that appears on a screen in a form of a dialog window. For example, text information is displayed in the status bar, an announcement is given, the electronic device vibrates, or an indicator light blinks.

The Android runtime includes a kernel library and a virtual machine. The Android runtime is responsible for scheduling and management of the Android system.

The kernel library includes two parts: a function that needs to be invoked in Java language and a kernel library of Android.

The application layer and the application framework layer run on the virtual machine. The virtual machine executes Java files at the application layer and the application framework layer as binary files. The virtual machine is configured to implement functions such as object lifecycle management, stack management, thread management, security and exception management, and garbage collection.

The system library may include a plurality of function modules, for example, a surface manager (surface manager), a media library (Media Library), a three-dimensional graphics processing library (for example, an OpenGL ES), and a 2D graphics engine (for example, an SGL).

The surface manager is configured to manage a display subsystem, and provide fusion of 2D and 3D layers for a plurality of applications.

The media library supports playback and recording in a plurality of frequently used audio and video formats, static image files, and the like. The media library may support a plurality of audio and video coding formats, for example, MPEG-4, H.264, MP3, C, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver. The following describes related concepts involved in the embodiments of the present invention.

Communications as a service (Communications-as-a-Service, CaaS) refers to encapsulating Internet-based communication capabilities such as a message, a voice, a video, a conference, and communication collaboration into an application programming interface (Application Programming interface, API) or a software development kit (Software Development Kit, SDK), which are open and provided for a third party for invoking.

A video shooting application may invoke, by integrating a CaaS Kit, a video call capability, a voice call capability, a conference capability, and the like that are provided by the CaaS. The following describes two manners in which the video shooting application invokes the video call capability provided by the CaaS.

Figure 3:
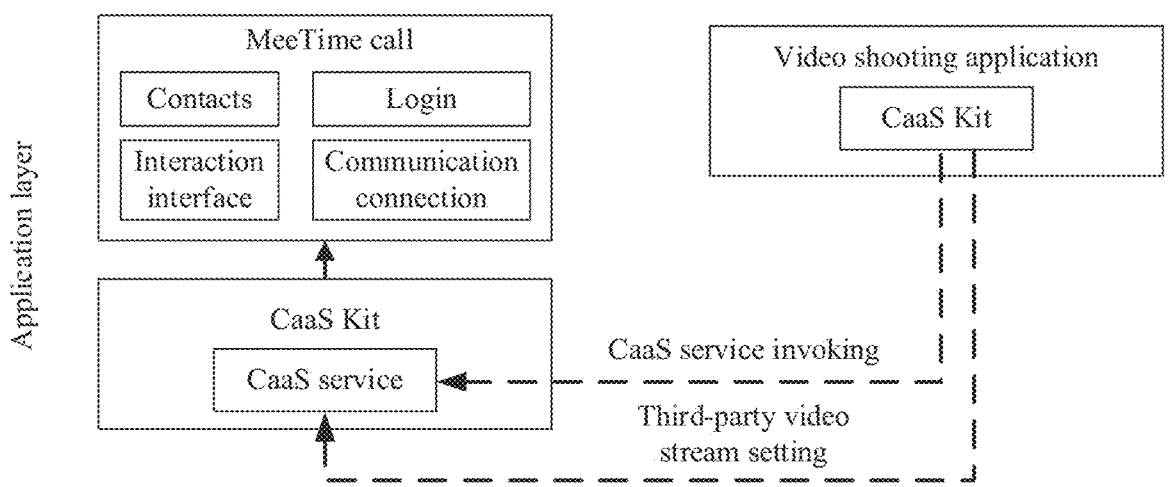
FIG. 3 is a schematic diagram of a software framework that provides a video capability for a video collection application by providing a CaaS service interface according to an embodiment of this application.

Manner 1: The CaaS Kit provides the video call capability for the video shooting application by providing a CaaS service interface. Refer to FIG. 3. This function is mainly implemented at the application layer of the electronic device 100. When the video shooting application (the first application in FIG. 2) needs to invoke a video call function, the video shooting application registers a CaaS service with the electronic device 100. The CaaS service provides a video service interface for the video shooting application, and video data shot by the video shooting application may be provided to a CaaS call service through the video service interface.

Still refer to FIG. 3. The CaaS service may be a CaaS service included in a video communication function (for example, a video communication application or a video communication function in instant messaging software). The video communication application is, for example, a MeeTime call function (a video communication function on a call screen), and the MeeTime call function includes modules such as a contact list, login information, an interaction interface, and a communication connection. The video communication application may alternatively be another application, for example, a video communication function in instant messaging software or a default video communication function in a system. In this case, in addition to providing the video service interface for a video collection application, the CaaS service further provides a video communications interface (for example, a video communication button). This is not limited in this embodiment of the present invention.

The video shooting application is, for example, an application for controlling a video collection device to perform video collection, and the video collection device and a video communications device are devices independent of each other. The video shooting application may be a default application in the system, a preinstalled application in the system, or a third-party application. In addition, an audio capability may be provided for an audio collection application in a same manner. This is not limited in this embodiment of the present invention.

In addition, the video shooting application may control the video collection device to shoot a video and a picture (photo).

Manner 2: A video stream shot by a video collection device is registered as a virtual camera of the system.

Figure 4:
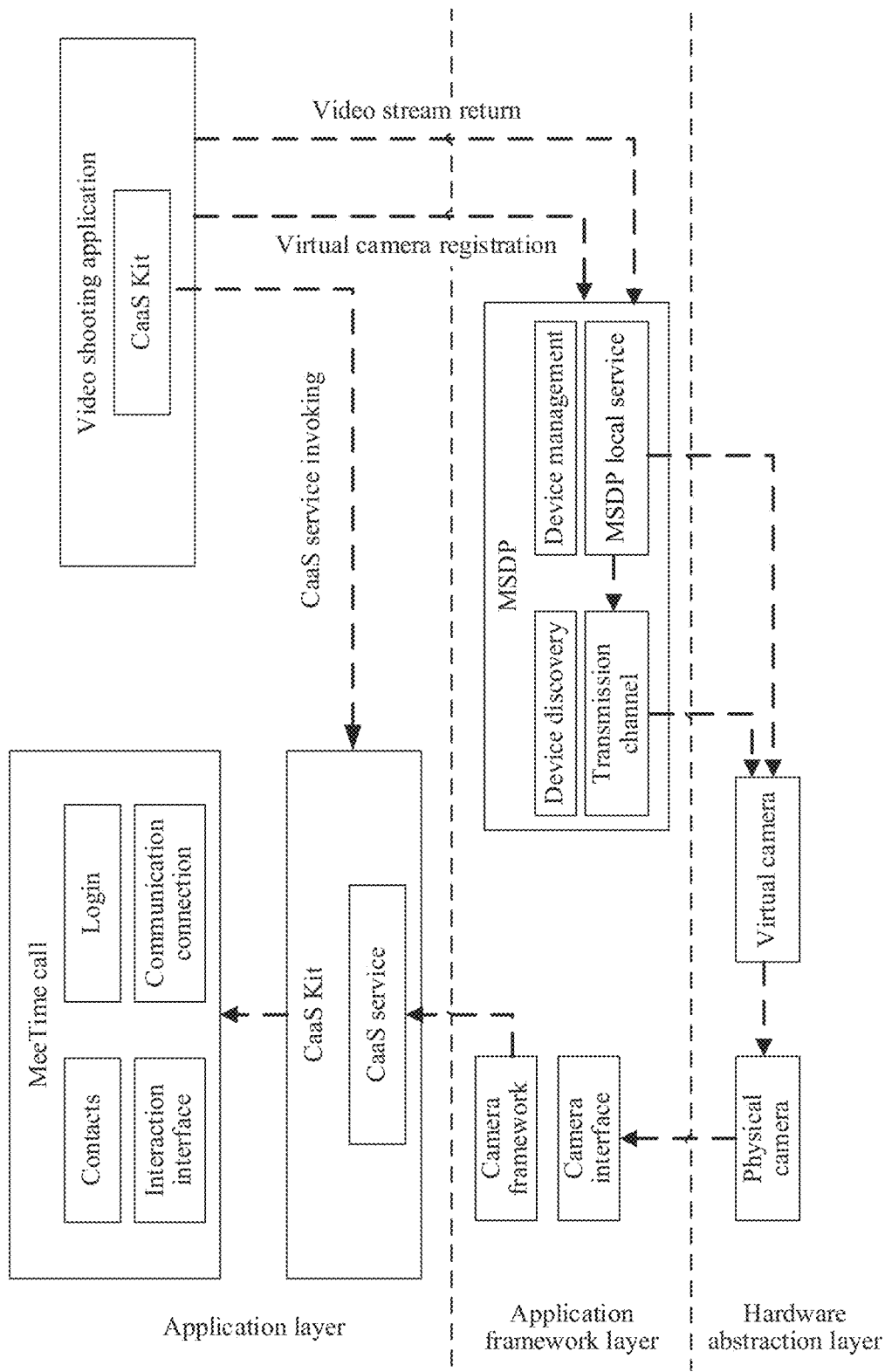
FIG. 4 is a schematic diagram of a software framework that provides a video capability for a video collection application by virtualizing video data collected by the video collection application into a virtual camera according to an embodiment of this application.

Refer to FIG. 4. A software architecture for implementing this solution includes:
  an application layer, where the application layer includes functions of various applications, for example, a MeeTime call function and a video shooting application; the MeeTime call function includes a CaaS function Tor example, a CaaS Kit); the CaaS function includes much content, for example, call signaling, media transmission, and a CaaS service; the CaaS function is provided, by using the CaaS service, for another application for invoking; and when the video shooting application needs to invoke a video function, the video shooting application first notifies an MSDP (Mobile Sensing Development Platform, providing distributed component virtualization) to register, as a virtual camera at a hardware framework layer, a video stream collected by an image collection device controlled by the video shooting application;
  an application framework layer, including: a camera framework, configured to externally provide a camera function; a camera interface, configured to obtain a video stream collected by a camera; the MSDP, configured to register the virtual camera, that is, virtualize a video stream collected by the video shooting application into a virtual camera at a hardware abstraction layer, where the MSDP is further configured to: obtain, from the video shooting application, the video stream collected by the image collection device, and send the video stream to the virtual camera as a video output collected by the virtual camera; and
  the hardware framework layer, including an abstract interface of a camera (a physical camera or the virtual camera), where both a physical camera (for example, a front-facing camera or a rear-facing camera) of the electronic device 100 and the virtual camera may be accessed through the camera interface.

When the video shooting application needs to invoke a CaaS video function, the video shooting application registers the CaaS service with the system. The CaaS service queries the MSDP for whether the virtual camera exists. If the virtual camera exists, the CaaS service obtains, through the camera interface, a video stream sent by the video shooting application of the virtual camera. The virtual camera and the physical camera have different tags, so that the CaaS service may accurately obtain video data of the virtual camera based on the tag of the virtual camera. Certainly, an audio capability may be provided for an audio collection application in a same manner. This is not limited in this embodiment of the present invention. Similarly, a video shooting device may shoot a video or a photo.

Figure 5:
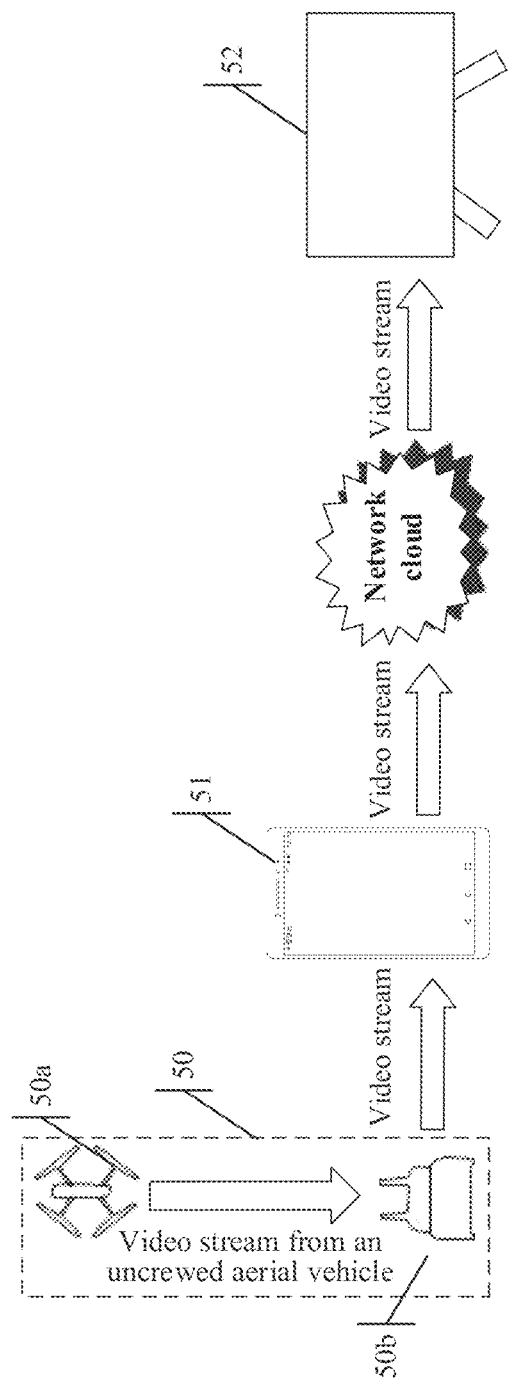
FIG. 5 is a framework diagram of a video communications system according to an embodiment of this application.

An embodiment of the present invention provides a video communication method, and the video communication method is applied to a video communications system. Refer to FIG. 5. The video communications system includes a video collection device 50, a video communications device 51, and a video receiving device 52.

The video collection device 50 is configured to obtain video data through collection. The video collection device 50 is, for example, an uncrewed aerial vehicle, an action camera, a pan-tilt-zoom camera, or a panoramic camera. The video collection device 50 in FIG. 5 is an uncrewed aerial vehicle. The uncrewed aerial vehicle includes an uncrewed aerial vehicle body 50a and a remote control handle 50b. An application is usually installed on the video communications device 51 to control the video collection device 50 to perform video collection, and the application is a video shooting application. The video shooting application is, for example, a control application of the uncrewed aerial vehicle or a control application of the pan-tilt-zoom camera.

A camera is disposed on the uncrewed aerial vehicle body 50a. After obtaining video data through collection by using the video data, the uncrewed aerial vehicle body 50a, first sends the video data to the remote control handle 50b, and then the remote control handle 50b sends the video data to the video communications device 51, for example, sends the video data to the video shooting application on the video communications device 51. The remote control handle 50b may be connected to the video communications device 51 in a wired manner or wireless manner. This is not limited in this embodiment of the present invention. Optionally, the uncrewed aerial vehicle may not include the remote control handle 50b, and the uncrewed aerial vehicle is directly controlled by the video communications device 51 to perform collection, and a video (or an image) collected by the uncrewed aerial vehicle is directly sent to the video shooting application of the video communications device 51.

The video communications device 51 is communicatively connected to the video collection device 50, and is configured to receive the video data collected by the video collection device 50. The video communications device 51 is, for example, a mobile phone, a tablet computer, a desktop computer, a smart watch, or a smart band, and the video communications device 51 may or may not include a camera. The video communications device 51 herein may be the electronic device 100 described above.

The video receiving device 52 is communicatively connected to the video communications device 51, and is configured to: perform video communication with the video communications device, obtain video data sent by the video communications device 51, and send video data to the video communications device 51. The video receiving device 52 is similar to the video communications device 51, and is, for example, a mobile phone, a tablet computer, a desktop computer, a smart watch, or a smart band. A type of the video receiving device 52 may be the same as or different from that of the video communications device 51.

Figure 6:
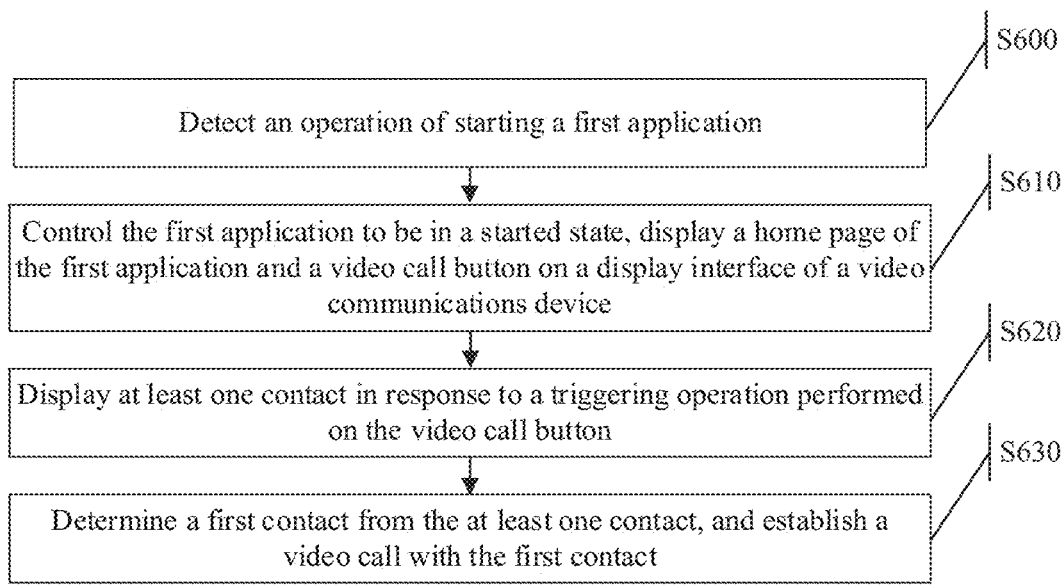
FIG. 6 is a flowchart of a video communication method according to an embodiment of this application.

Refer to FIG. 6. The video communication method includes the following steps.
  S600: Detect an operation of starting a first application. The first application (namely, the video shooting application described above) is configured to control the video collection device 50 to perform video collection. The first application may control another function of the video collection device 50 in addition to controlling the video collection device 50 to perform video collection, for example, control a motion start, a motion direction, and a motion speed of the video collection device 50. The operation of starting the first application is, for example, an operation of tapping an icon of the first application, an operation of generating a specific gesture, or an operation of generating a preset voice instruction.

S610: Control the first application to be in a started state, and display a home page of the first application and a video communication button on a display interface of the video communications device 31.

For example, after being started, the first application registers a CaaS service with a CaaS function. After detecting the registration of the first application, the CaaS function provides a video service interface for the first application, and provides the video communication button. Alternatively, after being started, the first application notifies an MSDP to register a video stream collected by the first application as a virtual camera, and then the first application invokes a CaaS service. The CaaS service obtains video data of an abstract interface of the virtual camera through a camera interface, and provides the video communication button for the first application.

The video communication button may be displayed on a surface of the home page of the first application. For example, the video communication button is displayed on the surface of the home page of the first application in a floating manner. Alternatively, the video communication button may be displayed beside the home page of the first application. For example, the home page of the first application is not displayed in full screen on the display interface of the video communications device 51, and the video communication button is displayed in an area beside the home page of the first application. This is not limited in this embodiment of the present invention.

The first application may register the CaaS service with the CaaS function when being started, or may register the CaaS service with the CaaS function only when a trigger condition is detected. The trigger condition is, for example, a preset gesture, a voice instruction, or an operation of tapping a preset button of a user.

Figure 7A:
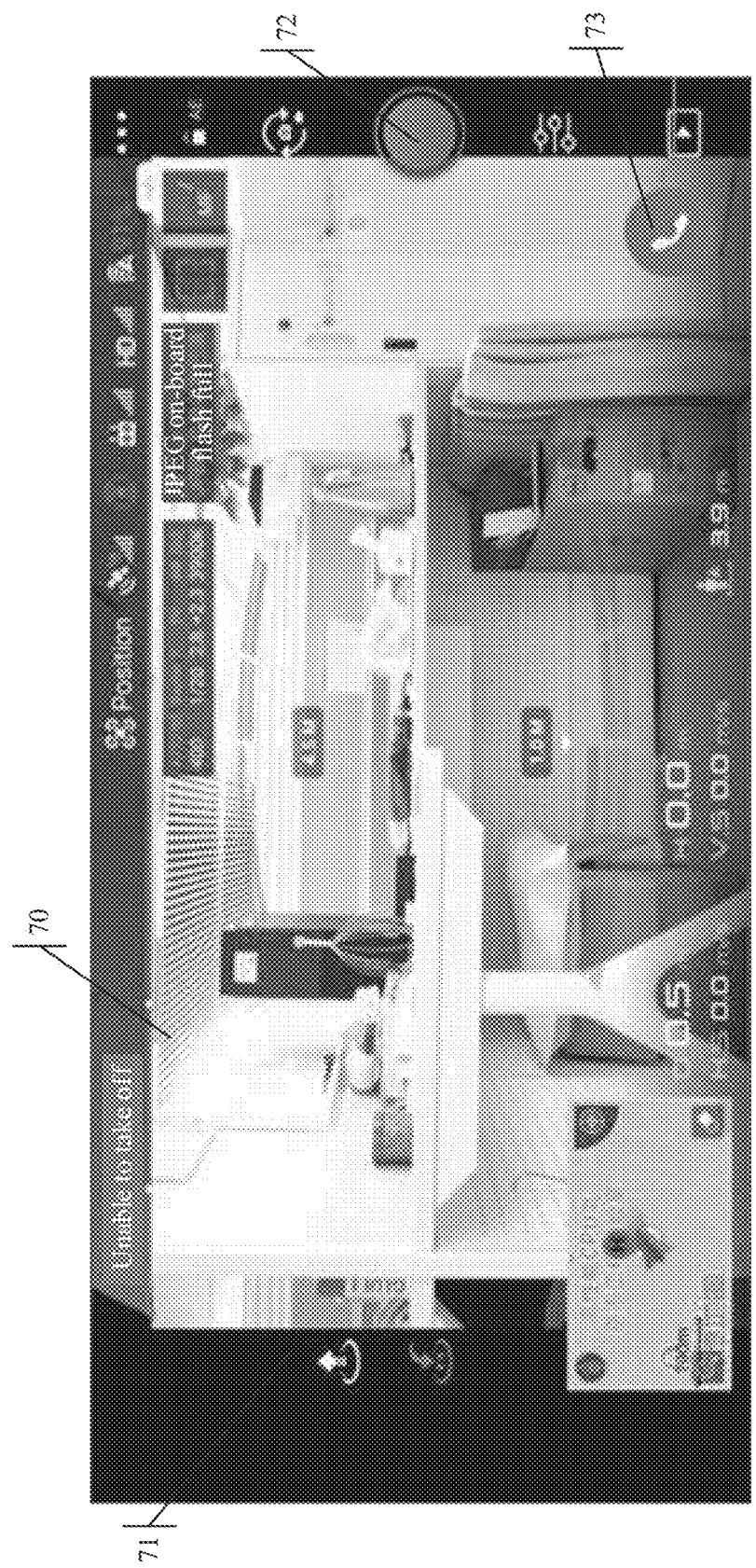
FIG. 7A to FIG. 7C are schematic diagrams of UI changes of a video communications device 51 in a video communication method according to an embodiment of this application.

For example, the first application is the control application of the uncrewed aerial vehicle. FIG. 7A is a schematic diagram of an interface of the control application of the uncrewed aerial vehicle. The control interface includes: a preview interface 70, configured to display an image shot by the uncrewed aerial vehicle in real time: a take-off button 71, where the video communications device 51 generate a take-off instruction in response to an operation of triggering the take-off button 71 (for example, tapping the button), and controls the uncrewed aerial vehicle to take off by sending the take-off instruction to the uncrewed aerial vehicle; a recording button 72, where the video communications device 51 records an image currently collected by the uncrewed aerial vehicle in response to an operation of triggering the recording button 72; and a video communication button 73, where the video communications device 51 may enable a video communication function in response to an operation of triggering the video communication button 73.

The video communication button 73 is a video communication button invoked from the CaaS service. The first application may invoke the video communication button 73 when being started, or may invoke the video communication button 73 based on another trigger condition. The video communication button 73 may be a floating button, an embedded button, or the like. The trigger condition is, for example, detecting a preset operation, responding to a preset voice instruction, or responding to a preset gesture.

S620: Display at least one contact in response to the triggering operation performed on the video communication button 73.

Figure 7B:
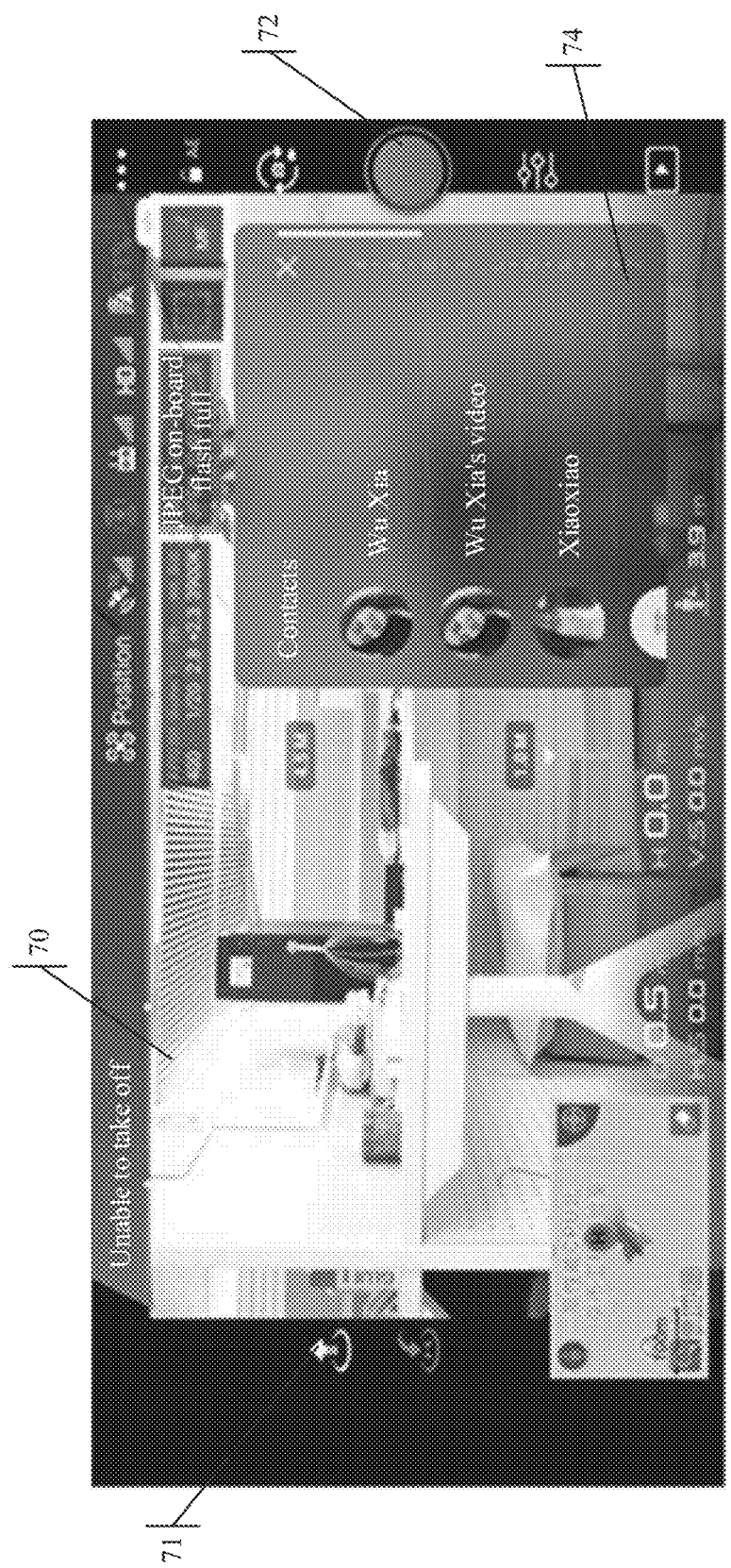

For example, the triggering operation is an operation of tapping a trigger button or an operation of generating a specific gesture. After detecting the operation of triggering the video communication button 73, the electronic device 100 obtains a contact in a call application of the electronic device 100, or obtains a contact of the CaaS service, and displays the contacts. The call application is, for example, a default video communication application on the video communications device 51 or a third-party video application. All contacts in the call application may be obtained as preset contacts, or a contact for which a video function is enabled may be obtained from the contacts as a preset contact. FIG. 7B is a schematic diagram of a display interface of the video communications device 51 after at least one contact 74 is displayed.

Figure 8:
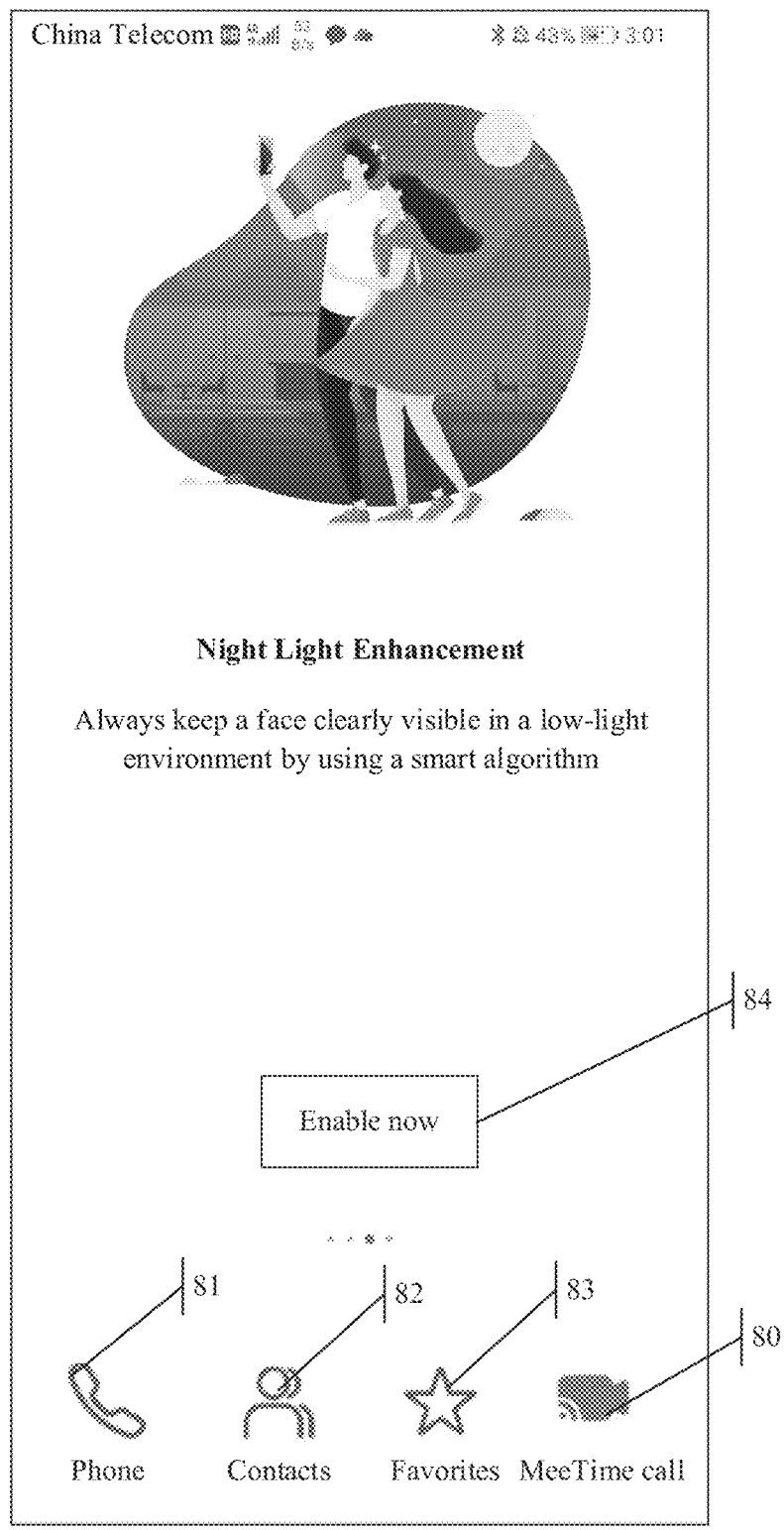
FIG. 8 is a schematic diagram of an interface for enabling a MeeTime call according to an embodiment of this application.

Refer to FIG. 8. A communication function of the video communications device 51 includes a MeeTime call function (where the MeeTime call function refers to a video communication function). After starting the call application, the user of the video communications device 51 displays a main interface of the call application. The main interface of the call application includes a phone control 81, a contact control 82, a favorites control 83, and a MeeTime call control 80. The phone control 81 is configured to trigger the video communications device 51 to display a recent call record that includes all calls and missed calls. The contact control 82 is configured to trigger the video communications device 51 to display all contact information on the call application. The personal favorites control 83 is configured to trigger the video communications device 51 to add some contacts as personal favorites, so that quick communication, for example, quickly sending an SMS message or quickly making a call, may be performed for the contacts by adding the contacts as the personal favorites. The MeeTime call control 80 is configured to trigger the video communications device 81 to enable a voice communication function. After detecting tapping the MeeTime call control 80 displayed on the main interface of the call application, the video communications device first determines whether the user enables the MeeTime call function, and after determining that the user does not enable the MeeTime call function, displays an "enable now" button 84 shown in FIG. 8. If the user wants to enable the MeeTime call function, the user taps the "enable now" button 84. After detecting an operation of the user tapping the "enable now" button 84, the video communications device 51 displays a login interface of the MeeTime call function. After the user enters a login account and a password on the login interface of the MeeTime call function, the MeeTime call function is enabled for the user, so that the user may perform video communication with another device by using the MeeTime call function; and information about the user currently enabling the MeeTime call function is updated to another electronic device through a server. After the MeeTime call function is enabled, video communication may be established with a peer device. Optionally, alternatively, after the video communications device 51 detects the operation of tapping the MeeTime call control 80, video communication may be directly established with the peer device.

After detecting the operation of the user tapping the MeeTime call control 80, the video communications device 51 may further display related information of the MeeTime call function. For example, FIG. 8 shows that the MeeTime call function has a night light enhancement function. To be specific, in a low-light environment, a face can be clearly visible when video communication is performed by using the MeeTime call control 80.

After detecting an operation of tapping the video communication button 73, the video communications device 51 may display an address book (or all contacts in another communications software), or may display only a contact having a video call function. When there are a large quantity of contacts, a scroll bar may be set on a display interface of the at least one contact, the displayed contact is switched in an automatic scrolling manner or a manual scrolling manner.

S630: Determine a first contact from the at least one contact in response to a user selection, and establish video communication with the first contact.

Figure 7C:
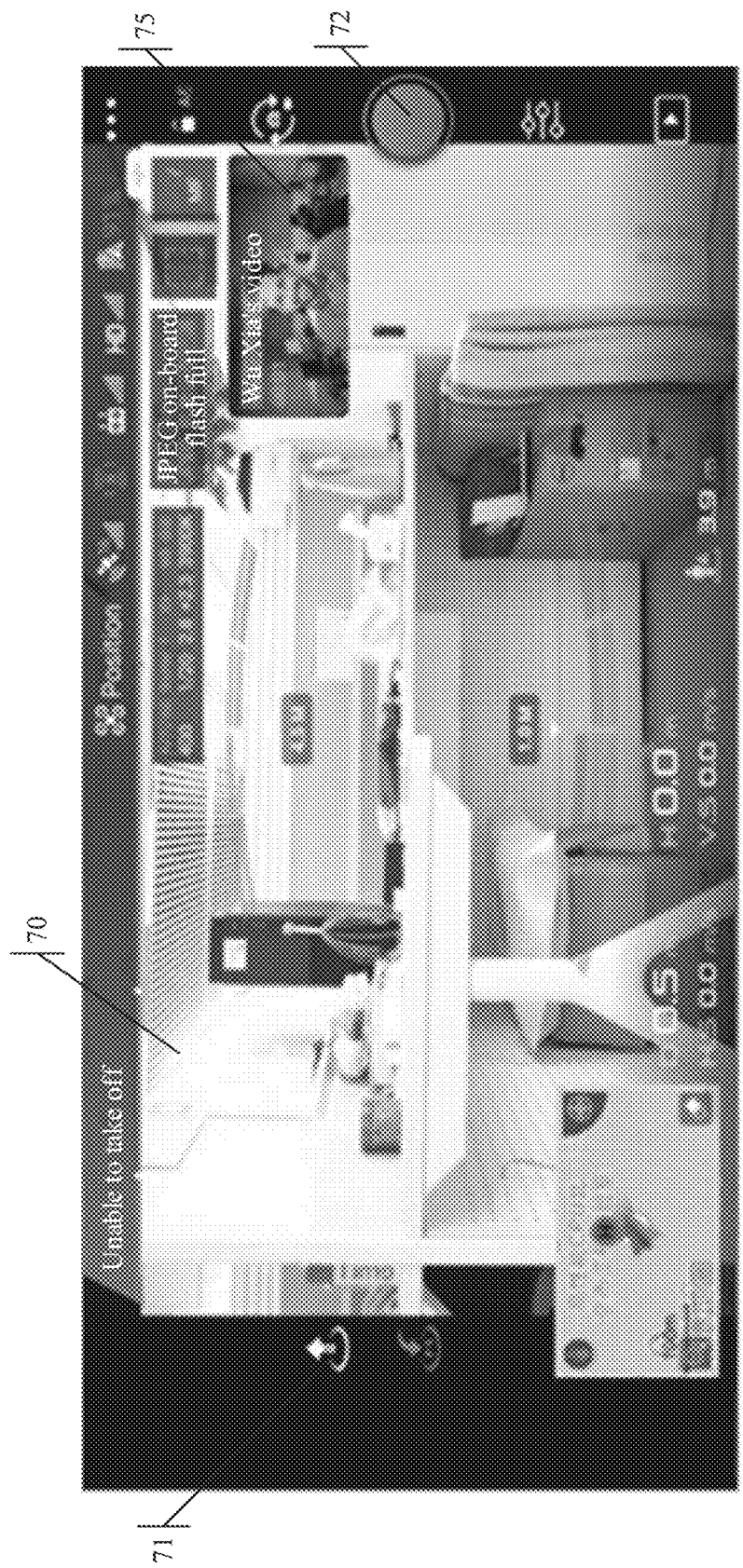

For example, the user of the video communications device 51 may tap a contact in a contact list, select a contact by using a voice instruction, or select a contact by moving a cursor up or down. After determining that the user selects the contact, the video communications device 51 initiates a video communication request to the contact. The video communication request is sent to the video receiving device 52. The video receiving device 52 may receive the video communication request by using a video communication application (for example, the MeeTime call function described above), and after the video receiving device 52, a video transmission channel is established between the video communications device 51 and the video receiving device 52. Then, the video communications device 51 sends the video data obtained from the video collection device 51 to the video receiving device 52, and the video receiving device 52 displays the obtained video data (for example, video data collected by a front-facing camera of the video receiving device 52 or video data collected by another camera near the video receiving device 52). After the video communications device 51 establishes a connection to the video receiving device 52, a window 75 may further be displayed on the display interface of the video communications device 51, to display video data received from the video receiving device 52, as shown in FIG. 7C.

In addition, a window is displayed on a display interface of the video receiving device 52, to display the video data that is sent from the video communications device 51 and that is collected by the video collecting device 50. The video communications device 51 may simultaneously obtain a video stream collected by the uncrewed aerial vehicle and a video stream collected by a front-facing camera, and send the video streams to the video receiving device 52. Two windows may be displayed on the display interface of the video receiving device 52. The video stream collected by the uncrewed aerial vehicle is displayed on one window, and the video stream collected by the front-facing camera of the video communications device 51 is displayed on the other window.

For example, after receiving the video communication request sent by the video communications device 51, the video receiving device 52 may indicate, in a pop-up manner on an interface of the video communication application (for example, an interface of the MeeTime call function described above), that there is a video call request. An answer button on the video receiving device 52 is tapped to establish a video connection to the video communications device 51, and the video receiving device 52 displays a window on the interface of the video communication application, to display the video data sent by the video communications device 51.

After the contact is selected, and the video communications device 51 sends the video call request, the video communications device 51 sends a video call request that carries a communication identification (Identification, ID) of the contact to the server. After receiving the video call request, the server determines an Internet protocol (Internet Protocol, IP) address of the video receiving device 51 by using the communication ID. After the video receiving device 51 confirms to establish voice communication, the server establishes a video call connection between the video communications device 51 and the video receiving device 52. After receiving the video stream sent by the video communications device 51, the server sends the video stream to the video receiving device 51 by using the IP address of the video receiving device 51.

In an optional embodiment, after the uncrewed aerial vehicle is in a flight state, to prevent a voice call function from causing interference to a user operation performed on the uncrewed aerial vehicle and causing damage to the uncrewed aerial vehicle, in a possible embodiment, after the uncrewed aerial vehicle is the flight state, the video communication button 73 is hidden on the display interface of the video communications device 51.

The user of the video communications device 51 may first establish a video connection to the video receiving device 52 by using the video communication button 73, and then tap a flight button 71 on the home page of the first application to control the uncrewed aerial vehicle to be in the flight state. After the uncrewed aerial vehicle is in the flight state, the user of the video communications device 51 needs to observe a current state, for example, a current flight altitude, whether there is an obstacle in front, of the uncrewed aerial vehicle in real time by using the first application. Therefore, to prevent the video communication button 73 from causing the interference (for example, an image of the uncrewed aerial vehicle being blocked, or the user being busy with a video call and paying no attention to the flight state of the uncrewed aerial vehicle) to the user operation performed on the uncrewed aerial vehicle, after the uncrewed aerial vehicle takes off, the video communication button 73 is controlled to be hidden.

Optionally, after the video communications device 51 and the video receiving device 52 enable the video communication, a hang-up button may further be displayed on the display interface of the video communications device 51. The hang-up button is displayed at any location, for example, displayed on a surface of the first application, and optionally, may be displayed on a surface of the window 75, so that the user can disable the video call function by triggering the hang-up button 73.

However, for some devices that are not dangerous when running, the video communication button 73 may also be always in a display state. This is not limited in this embodiment of the present invention.

In addition, the foregoing solution may also be used for image collection and audio collection. When the solution is used for image collection, the video collection apparatus 50 may be an image collection apparatus, the video communications device 51 may be an image transmission device, and the video receiving device 52 may be an image receiving device. When the foregoing solution is used for audio collection, the video collection apparatus 50 may be an audio collection device, the video communications device 51 may be an audio transmission device, and the video receiving device 52 may be an audio receiving device. The image transmission device, a video transmission device, and the audio transmission device may be a same device or different devices. Similarly, the image receiving device, the video receiving device, and the audio receiving device may be a same device or different devices.

In addition, the video receiving device 52 may have only a video receiving function, or may have both a video receiving function and a video sending function. In one case, video communication is performed between the video receiving device 52 and the video communications device 51. To be specific, video data is sent to each other. In another case, after receiving the video data of the video communications device 51, the video receiving device 52 may play the video data by using the display interface of the video receiving device 52, or may send the video data to another electronic device including a display unit for playing.

In addition, in a specific implementation process, the foregoing solution may further used for the user video communication application. For example, the user of the video communications device 51 enables the video communication application, so that a camera setting interface may be provided for the video communication application (where the camera setting interface may be located in the video communication application, or may be located in system settings. This is not limited in this embodiment of the present invention). The user binds each third-party camera (the video collection device 50) in advance, so that when performing video communication, the user may select either the physical camera provided in the video communications device 51 or the configured third-party camera to perform video communication.

According to the foregoing solution, when the first application does not have a video call function, a video call service can be invoked, and video data collected by a third-party device (the video collection device 50) can be sent to the video receiving device 52, so that content of video data transmitted in a video call can be extended.

The foregoing embodiments are merely intended to describe the technical solutions of this application, but not to limit this application. Although this application is described in detail with reference to the foregoing embodiments, persons of ordinary skill in the art should understand that they may still make modifications to the technical solutions recorded in the foregoing embodiments or make equivalent replacements to some technical features thereof without departing from the scope of the technical solutions of the embodiments of this application.

What is claimed is:

1. A method comprising:
   detecting a starting operation of a first application, wherein the first application is configured to control an uncrewed aerial vehicle comprising a video collection device, to perform video collection and control a motion start of the uncrewed aerial vehicle;
   invoking a Communication as a Service (CaaS) function comprising a video service;
   controlling the first application in a started state;
   displaying a home page of the first application and a video communication button on a display interface;
   obtaining, on the video communication button, a triggering operation;
   displaying on the home page, in response to the triggering operation, at least one contact;
   obtaining a first contact from a user selection of at least one contact;
   establishing, in response to the user selection, a video communication with the first contact;
   obtaining a take-off operation;
   controlling, in response to the take-off operation, the uncrewed aerial vehicle to enter a flight state;
   controlling the video communication button to be in a hidden state after the uncrewed aerial vehicle has entered the flight state; and
   disabling video communication at the uncrewed aerial vehicle after movement is detected.

2. The method of claim 1, wherein after establishing the video communication with the first contact, the method further comprises:
   obtaining, from the first contact, video data; and
   displaying a video receiving window configured to display the video data.

3. The method of claim 1, wherein the first application is further configured to control a motion direction of the uncrewed aerial vehicle and control a motion speed of the uncrewed aerial vehicle.

4. The method of claim 1, wherein the operation of starting the first application comprises receiving a tap on an icon of the first application.

5. The method of claim 1, wherein the operation of starting the first application comprises receiving a gesture input.

6. The method of claim 1, wherein the operation of starting the first application comprises receiving a voice instruction.

7. Video communications apparatus comprising:
   an uncrewed aerial vehicle comprising:
     a video collection device;
     a display interface;
     a memory configured to store instructions; and
     one or more processors coupled to the video collection device, the display interface, and the memory, wherein the instructions, when executed by the one or more processors, cause the apparatus to:
     detect a starting operation of a first application, wherein the first application is configured to control the video collection device to perform video collection and control a motion start of the uncrewed aerial vehicle;
     invoke a Communication as a Service (CaaS) function comprising a video service;
     control the first application in a started state;
     display a home page of the first application and a video communication button on the display interface;
     receive, on the video communication button, a triggering operation;
     display, in response to the triggering operation, at least one contact;
     receive a first contact from a user selection of at least one contact;
     establish, in response to the user selection, a video communication with the first contact;
     obtain a take-off operation;
     control, in response to the take-off operation, the uncrewed aerial vehicle to enter a flight state;
     control the video communication button to be in a hidden state after the uncrewed aerial vehicle has entered the flight state; and
     disable video communication at the uncrewed aerial vehicle after movement is detected.

8. The apparatus of claim 7, wherein after establishing the video communication with the first contact, the instructions, when executed by the one or more processors, further cause the apparatus to:
   obtain, from the first contact, video data; and
   display a video receiving window configured to display the video data.

9. The apparatus of claim 7, wherein the first application is further configured to control a motion direction of the uncrewed aerial vehicle and a motion speed of the uncrewed aerial vehicle.

10. The apparatus of claim 7, wherein the operation of starting the first application comprises an operation of receiving tapping an icon of the first application on the display interface.

11. The apparatus of claim 7, wherein the operation of starting the first application comprises an operation of receiving a gesture on the display interface.

12. The apparatus of claim 7, further comprising an audio interface coupled to the one or more processors, wherein the operation of starting the first application comprises an operation of receiving a voice instruction.

13. A computer program product comprising computer-executable instructions that are stored on a non-transitory computer-readable storage medium, and that when executed by one or more processors, cause an uncrewed aerial vehicle to:
    detect a starting operation of a first application, wherein the first application is configured to control a video collection device to perform video collection and control a motion start of the uncrewed aerial vehicle;
    invoke a Communication as a Service (CaaS) function comprising a video service;
    control the first application in a started state;
    display a home page of the first application and a video communication button on a display interface of the uncrewed aerial vehicle;
    obtain, on the video communication button, a triggering operation;
    display, in response to the triggering operation, at least one contact;
    obtain a first contact from a user selection of at least one contact;
    establish, in response to the user selection, a video communication with the first contact;
    obtain a take-off operation;
    control, in response to the take-off operation, the uncrewed aerial vehicle to enter a flight state;
    control the video communication button to be in a hidden state after the uncrewed aerial vehicle has entered the flight state; and
    disable video communication after movement is detected.

14. The computer program product of claim 13, wherein after establishing the video communication with the first contact, the computer-executable instructions further cause the uncrewed aerial vehicle to:
    obtain, from the first contact, video data; and
    display a video receiving window configured to display the video data.

15. The computer program product of claim 13, wherein the first application further controls a motion direction of the uncrewed aerial vehicle and controls a motion speed of the uncrewed aerial vehicle.

16. The computer program product of claim 13, wherein the first application further controls a motion start of the uncrewed aerial vehicle, controls a motion direction of the uncrewed aerial vehicle, and controls a motion speed of the uncrewed aerial vehicle.

17. The computer program product of claim 13, wherein the first application further controls a motion start of the uncrewed aerial vehicle, controls a motion direction of the uncrewed aerial vehicle, and controls a motion speed of the uncrewed aerial vehicle.

18. The computer program product of claim 13, wherein the operation of starting the first application comprises receiving a tap on an icon of the first application.

19. The computer program product of claim 13, wherein the operation of starting the first application comprises receiving a gesture input.

20. The computer program product of claim 13, wherein the operation of starting the first application comprises receiving a voice instruction.

* * * * *